US008310375B2

(12) United States Patent
Sin et al.

(10) Patent No.: US 8,310,375 B2
(45) Date of Patent: Nov. 13, 2012

(54) SYSTEM AND METHOD FOR PROVIDING VEHICLE PARKING INFORMATION USING NAVIGATION SATELLITE

(75) Inventors: Cheon-Sig Sin, Daejon (KR); Sang-Uk Lee, Daejon (KR); Jae-Hoon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 904 days.

(21) Appl. No.: 12/182,306

(22) Filed: Jul. 30, 2008

(65) Prior Publication Data

US 2009/0085773 A1 Apr. 2, 2009

(30) Foreign Application Priority Data

Sep. 28, 2007 (KR) ........................ 10-2007-0098308

(51) Int. Cl.
*B60Q 1/48* (2006.01)

(52) U.S. Cl. ............. 340/932.2; 340/539.1; 340/539.11; 340/539.13; 340/928; 235/378; 235/384; 705/13; 705/418

(58) Field of Classification Search ............... 340/932.2, 340/539.1, 539.11, 539.13, 928; 235/378, 235/384; 705/13, 418
See application file for complete search history.

(56) References Cited

U.S. PATENT DOCUMENTS

| | | | | |
|---|---|---|---|---|
| 6,750,768 | B2 * | 6/2004 | Yang et al. | 340/571 |
| 6,750,786 | B1 * | 6/2004 | Racunas, Jr. | 340/932.2 |
| 2002/0109610 | A1 * | 8/2002 | Katz | 340/932.2 |
| 2007/0040701 | A1 * | 2/2007 | Browne et al. | 340/932.2 |
| 2008/0071611 | A1 * | 3/2008 | Lovett | 705/13 |

FOREIGN PATENT DOCUMENTS

| | | |
|---|---|---|
| JP | 2003-123110 | 4/2003 |
| JP | 2005-107844 | 4/2005 |
| KR | 2003-0032236 | 4/2003 |
| KR | 2004-0106688 | 12/2004 |
| KR | 2006-0028331 | 3/2006 |
| KR | 2007-0033179 | 3/2007 |

* cited by examiner

*Primary Examiner* — George Bugg
*Assistant Examiner* — Ojiako Nwugo
(74) *Attorney, Agent, or Firm* — Rabin & Berdo, P.C.

(57) ABSTRACT

Provided is a system and method for providing vehicle parking information using a navigation satellite. The system includes: a monitoring unit for photographing an image of a vehicle parking space and transmitting the image to a parking space checking unit; the parking space checking unit for checking a vacant parking space based on the transmitted vehicle parking space image and transmitting vacant parking space acquisition information to a location information computing unit; and the location information computing unit for creating and transmitting location information of the vacant parking space, which is vehicle parking information, to a navigation satellite based on own location information acquired based on navigation information transmitted from an external navigation satellite and the transmitted vacant parking space acquisition information.

20 Claims, 4 Drawing Sheets

SYSTEM AND METHOD FOR PROVIDING VEHICLE PARKING INFORMATION USING NAVIGATION SATELLITE

CROSS-REFERENCE(S) TO RELATED APPLICATIONS

The present invention claims priority of Korean Patent Application No. 10-2007-0098308,filed on Sep. 28, 2007, which is incorporated herein by reference.

BACKGROUND OF THE INVENTION

1. Field of the Invention

The present invention relates to a system and method for providing vehicle parking information using a navigation satellite; and, more particularly, to a vehicle parking information providing system and method that helps a vehicle driver exactly figures out a location of a vacant parking space close to his own location by receiving information of the parking space by using a global positioning technology and easily parks his vehicle.

This work was supported by the IT R&D program for MIC/IITA [2007-S-301-01, “Development of Global Navigation Satellite System Ground Station and Search And Rescue Beacon Technologies”].

2. Description of Related Art

A Global Positioning System (GPS) is applied to a wide range of fields such as providing of present location information, automatic navigation and traffic control of an airplane, a ship, and a vehicle, preventing of oil tanker collision, precise surveying of civil engineering works, and cartography. A GPS receiver used in a wide range of fields has been developed and used in diverse forms from a portable type to a satellite-mounted type.

As a technology related to the GPS, a location-based service system using a GPS repeater which is called a first conventional technology will be described hereinafter.

The first conventional technology relates to a location-based service system using a GPS repeater for providing a location-based service anywhere with no regard to Line Of Sight (LOS) by installing the GPS repeater for each section inside subway.

The first conventional technology solves a problem that the location-based service cannot be provided in a place where there is no LOS for the conventional GPS satellite does not exist, e.g., an underground parking space, the inside of the subway, and the inside of a building. To be specific, the first conventional technology is to set up diverse specifications based on configuration and service regions of the GPS repeater for providing the location-based service in a region where the LOS is not secure and to provide a smooth location-based service to a user in the region where the LOS of the satellite does not exist.

As another technology related to GPS, a vehicle emergency report system using the GPS, which is called a second conventional technology, will be described hereinafter.

The second conventional technology is suggested to grasp a posture and damage of a vehicle by using GPS in an overturn accident of the vehicle or traffic accidents and to report emergency to a base station by using a car phone mounted on the vehicle.

The second conventional technology is suggested to prevent an accident from developing into more serious disaster, reduce a production cost for building an emergency report system, and improve convenience and productivity of workers by reducing a work time by detecting the posture and state of the vehicle by using the GPS receiver and reporting the emergency to the base station by using the car phone mounted on the vehicle when the overturn accident or the traffic accident is generated.

The emergency report system includes first, second and third GPS receivers, a MICOM, a message storage, and an accident notifying means. The first GPS receiver is installed to be fixed on a front of a vehicle body based on a center point of the vehicle body including latitude, longitude, and altitude. The second and third GPS receivers are installed to be fixed on left and right parts of the vehicle body based on the center point. The MICOM receives a signal on the posture and state of the vehicle detected by the first, second and third GPS receivers and determines an overturn or accident state of the vehicle. The accident notifying means notifies the overturn or accident state of the vehicle to the base station of the vehicle by control of the MICOM.

As described above, the GPS is used in diverse fields but a GPS related technology for solving a parking problem of the vehicle in a complicated downtown does not exist.

Therefore, a method for efficiently solving the parking problem of the vehicle in the complicated downtown is essentially required.

SUMMARY OF THE INVENTION

An embodiment of the present invention is directed to providing a vehicle parking information providing system and method that helps a vehicle driver exactly figures out a location of a vacant parking space close to own location by receiving information of a parking space by using a global positioning technology and easily parks a vehicle.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a system for providing vehicle parking information, including: a monitoring unit for photographing an image of a vehicle parking space and transmitting the image to a parking space checking unit; the parking space checking unit for checking a vacant parking space based on the transmitted vehicle parking space image and transmitting vacant parking space acquisition information to a location information computing unit; and the location information computing unit for creating and transmitting location information of the vacant parking space, which is vehicle parking information, to a navigation satellite based on vehicle location information acquired based on navigation information transmitted from an external navigation satellite and the transmitted vacant parking space acquisition information.

In accordance with another aspect of the present invention, there is provided a method for providing vehicle parking information, including: photographing a vehicle parking space to acquire an image of the vehicle parking space; creating vacant parking space acquisition information by finding a vacant parking space based on the acquired parking space image; and creating location information of the vacant parking space, which is vehicle parking information, based on vehicle location information acquired based on navigation information transmitted from an external navigation satellite and the created vacant parking space acquisition information, and transmitting the vehicle parking information to the navigation satellite.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
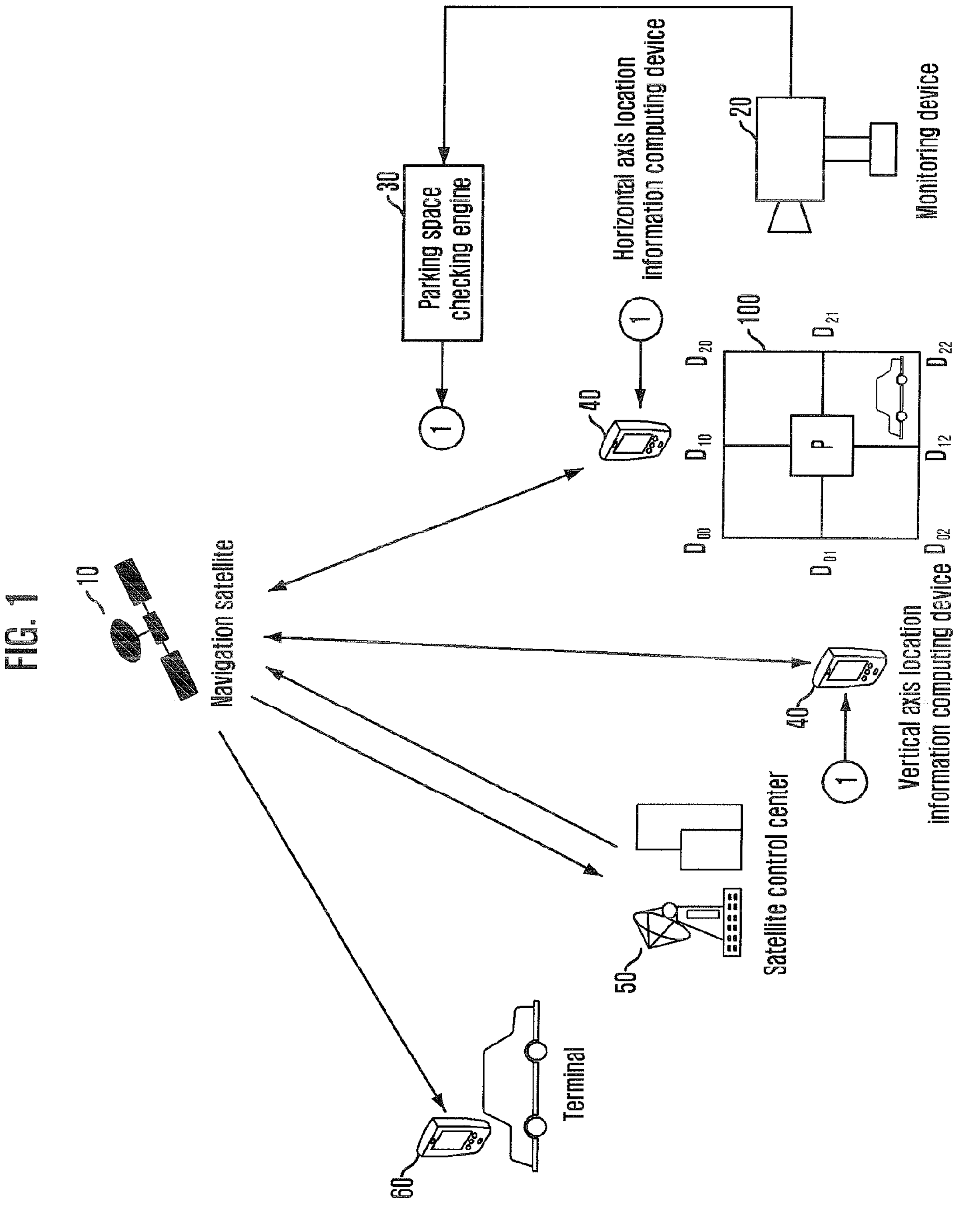
FIG. 1 shows a system for providing vehicle parking information using a navigation satellite in accordance with an embodiment of the present invention.

FIG. 1 shows a system for providing vehicle parking information using a navigation satellite in accordance with an embodiment of the present invention.

Referring to FIG. 1, the system for providing vehicle parking information using the navigation satellite in accordance with the present invention includes a navigation satellite 10, a monitoring device 20, a parking space checking engine 30, a location information output device 40, and a satellite control center 50.

The navigation satellite 10 is a navigation satellite such as Galileo which has been developed from European Union (EU). The navigation satellite 10 broadcasts navigation information, i.e., a navigation signal, to the location information output device 40 in real-time through a satellite link between the satellite and the ground.

Also, when the navigation satellite 10 receives vehicle parking information, i.e., location information of a vacant parking space, and additionally receives images of the vacant parking space from the location information output device 40, the navigation satellite 10 broadcasts the location information of the vacant parking space and the image to the terminal 60 mounted on the vehicle.

The monitoring device 20 is a device for photographing an image such as a camera installed in a vehicle parking space region 100. The monitoring device 20 photographs images of all parking spaces of the vehicle parking space region 100 and transmits the image of the photographed vehicle parking space to the parking space checking engine 30 in real-time.

The monitoring device 20 photographs the image of the vehicle parking space region 100 in real-time while the power is turned on from a time when the monitoring device 20 is installed in the vehicle parking space region 100 and operated.

The parking space checking engine 30 checks a vacant parking space in the vehicle parking space region 100 based on the image of the vehicle parking space region 100 transmitted from the monitoring device 20. When the vacant parking space is acquired in the vehicle parking space region 100, the parking space checking engine 30 transmits information that the vacant parking space is acquired, i.e., vacant parking space acquisition information, and an additional photograph image of the vacant parking space to the location information output device 40 which is the closest to the vacant parking space. Meanwhile, when the vacant parking space is not acquired in the vehicle parking space region 100, the parking space checking engine 30 can be realized not to transmit the vacant parking space acquisition information and the additional image of the vacant parking space to the location information output device 40.

For example, the parking space checking engine 30 can check whether the vacant parking space is acquired in the vehicle parking space region 100 by determining whether there is an operation or a body of the vehicle in each block of the vehicle parking space region 100.

The vacant parking space acquisition information may include identification (ID) number or general location information of the vacant parking space in the vehicle parking space region such that the location information output device 40 can recognize a general location of the vacant parking space inside the vehicle parking space region.

The location information output device 40 outputs own present location information on a Global Positioning System (GPS) based on Pseudorange of the navigation information, i.e., a navigation signal, broadcasted from a least 4 navigation satellites 10 through the satellite link between the satellites and the ground.

The location information output device 40 is located in each of horizontal and vertical axes of the vehicle parking space region 100. One location information output device 40 may be located in each of the horizontal and vertical axes of the vehicle parking space region 100 or the location information output device 40 may be located in the horizontal and vertical axes at a predetermined interval.

Also, when the location information output device 40 receives the vacant parking space acquisition information and the additional image from the parking space checking engine 30, the location information output device 40 outputs location information of an exact vacant parking space in the horizontal and vertical axes of the vehicle parking space region 100 based on the received vacant parking space acquisition information and the acquired own present location information on GPS. Subsequently, the location information output device 40 transmits the outputted location information of the vacant parking space, i.e., vehicle parking information, in the vehicle parking space region 100 and the additional image to the navigation satellite 10.

The navigation satellite control center 50 includes an antenna and a Radio Frequency (RF) device for transmitting/receiving a signal with the navigation satellite 10, and a storage device for storing the vehicle parking information. The navigation satellite control center 50 monitors whether the navigation satellite 10 can receive the vehicle parking information and the additional image from the location information output device 40 and broadcast them to the terminal 60 mounted on the vehicle.

Since there are a plurality of navigation satellites 10, the navigation satellite control center 50 monitors whether the navigation satellites 10 can communicate with the location information output device 40 and the terminal 60 mounted on the vehicle. When there is a navigation satellite 10 having an error among a plurality of navigation satellites 10, the navigation satellite control center 50 enables another navigation satellite 10 instead of the navigation satellite 10 having the error to communicate. The navigation satellite control center 50 may include a satellite link for communication with the navigation satellite 10, if necessary.

The terminal 60 mounted on the vehicle provides location information and an image of the vehicle such as the vehicle navigation. The terminal 60 receives the vehicle parking information and the additional image of vacant parking space broadcasted from the navigation satellite 10 and displays vehicle parking information which is close to own present location on monitor such that a vehicle driver can exactly and easily find the location of the vacant parking space close to own present location.

Figure 2:
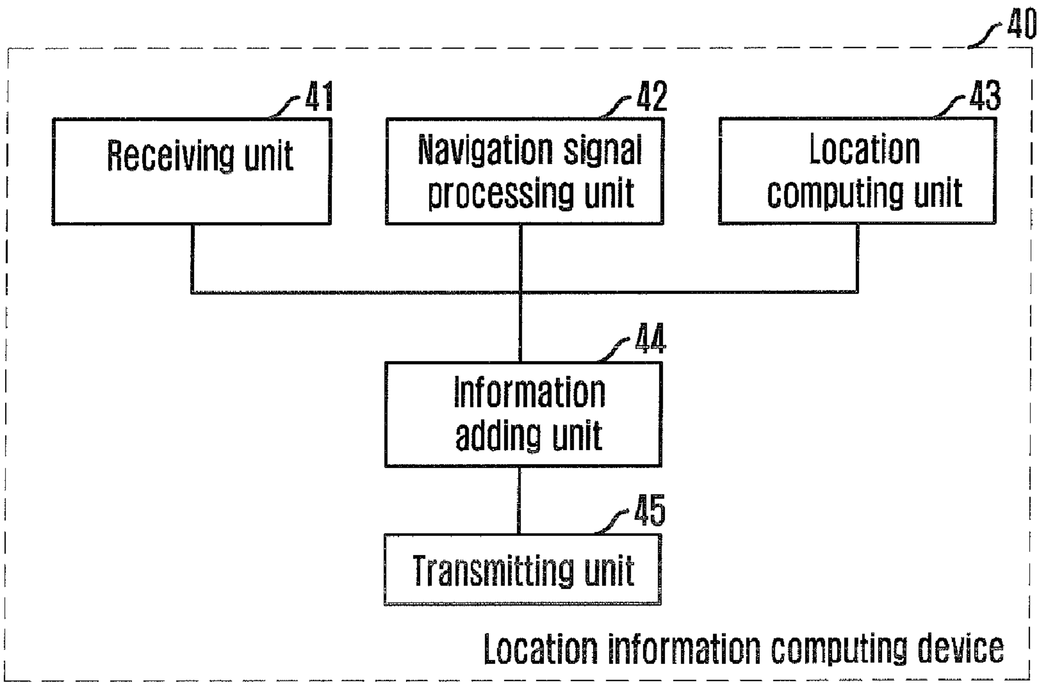
FIG. 2 is a block diagram showing a location information output device in accordance with an embodiment of the present invention.

FIG. 2 is a block diagram showing the location information output device in accordance with an embodiment of the present invention.

Referring to FIG. 2, the location information output device 40 in accordance with the present invention includes a receiving unit 41, a navigation signal processing unit 42, a location computing unit 43, an information adding unit 44, and a transmitting unit 45.

The receiving unit 41 receives navigation information, i.e., a navigation signal, broadcasted from the navigation satellite 10 in real-time, vacant parking space acquisition information provided from the parking space checking engine 30, and an additional image of the vacant parking space.

The navigation signal processing unit 42 acquires present vehicle location information on GPS by processing the navigation signal received through the receiving unit 41.

The location computing unit 43 outputs exact vehicle parking information in the vehicle parking space region 100 based on own present location information on GPS acquired by the navigation signal processing unit 42 and vacant parking space acquisition information received through the receiving unit 41.

When the location information output device 40 is located in a horizontal axis of the vehicle parking space region 100, the location computing unit 43 outputs location information of the vacant parking space in the horizontal axis of the vehicle parking space region 100. When the location information output device 40 is located in a vertical axis of the vehicle parking space region 100, the location computing unit 43 outputs location information of the vacant parking space in the vertical axis of the vehicle parking space region 100. Accordingly, it is possible to acquire exact location information in the vehicle parking space region 100.

The information adding unit 44 is an additional constituent element and adds the image of the vacant parking space additionally received through the receiving unit 41 and the vehicle parking information outputted from the location computing unit 43. That is, when the image of the vacant parking space is realized not to be provided, it is realized without the information adding unit 44 and the vehicle parking information outputted from the location computing unit 43 is transmitted directly to the transmitting unit 45.

The transmitting unit 45 transmits the vehicle parking information outputted from the location computing unit 43 to the navigation satellite 10 or transmits the vehicle parking information and the image added by the information adding unit 44 to the navigation satellite 10.

Figure 3:
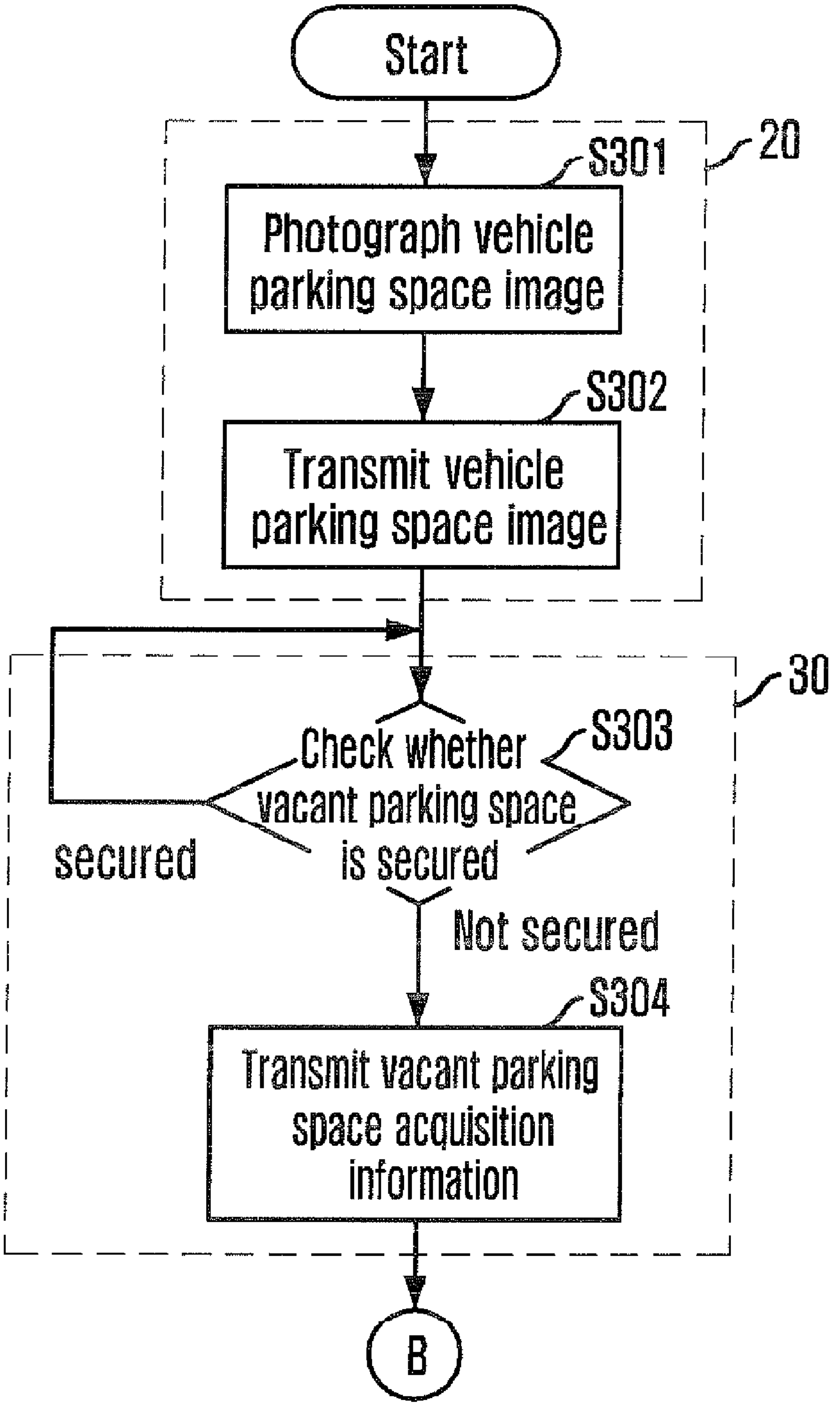
FIG. 3 is a flowchart describing a procedure for transmitting vacant parking space acquisition information in accordance with an embodiment of the present invention.

FIG. 3 is a flowchart describing a procedure for transmitting the vacant parking space acquisition information in accordance with an embodiment of the present invention.

The monitoring device 20 photographs images of all vehicle parking spaces of the vehicle parking space region 100 at step S301 and transmits the images of the photographed vehicle parking space to the parking space checking engine 30 in real-time at step S302.

The parking space checking engine 30 checks at step S303 whether the vacant parking space is acquired in the vehicle parking space region 100 based on the image of the vehicle parking space region 100 transmitted from the monitoring device 20.

For example, the parking space checking engine 30 can check whether the vacant parking space is acquired in the vehicle parking space region 100 by determining whether there is an operation or a body of a vehicle in each block of the vehicle parking space region 100.

At the check result of the step S303, when the vacant parking space is acquired in the vehicle parking space region 100, the vacant parking space acquisition information and the additional image of the photographed vacant parking space are transmitted to the location information output device 40 which is the most closely located from the vacant parking space at step S304.

The vacant acquisition information includes identification (ID) or general location information inside the vehicle parking space region such that the location information output device 40 can recognize a general location of the vacant parking space inside the vehicle parking space.

At the check result of the step S303, when the vacant parking space is not acquired in the vehicle parking space region 100, a logic flow goes to the step S303 without transmitting the vacant parking space acquisition information and the additional image of the photographed vacant parking space to the location information output device 40.

Figure 4:
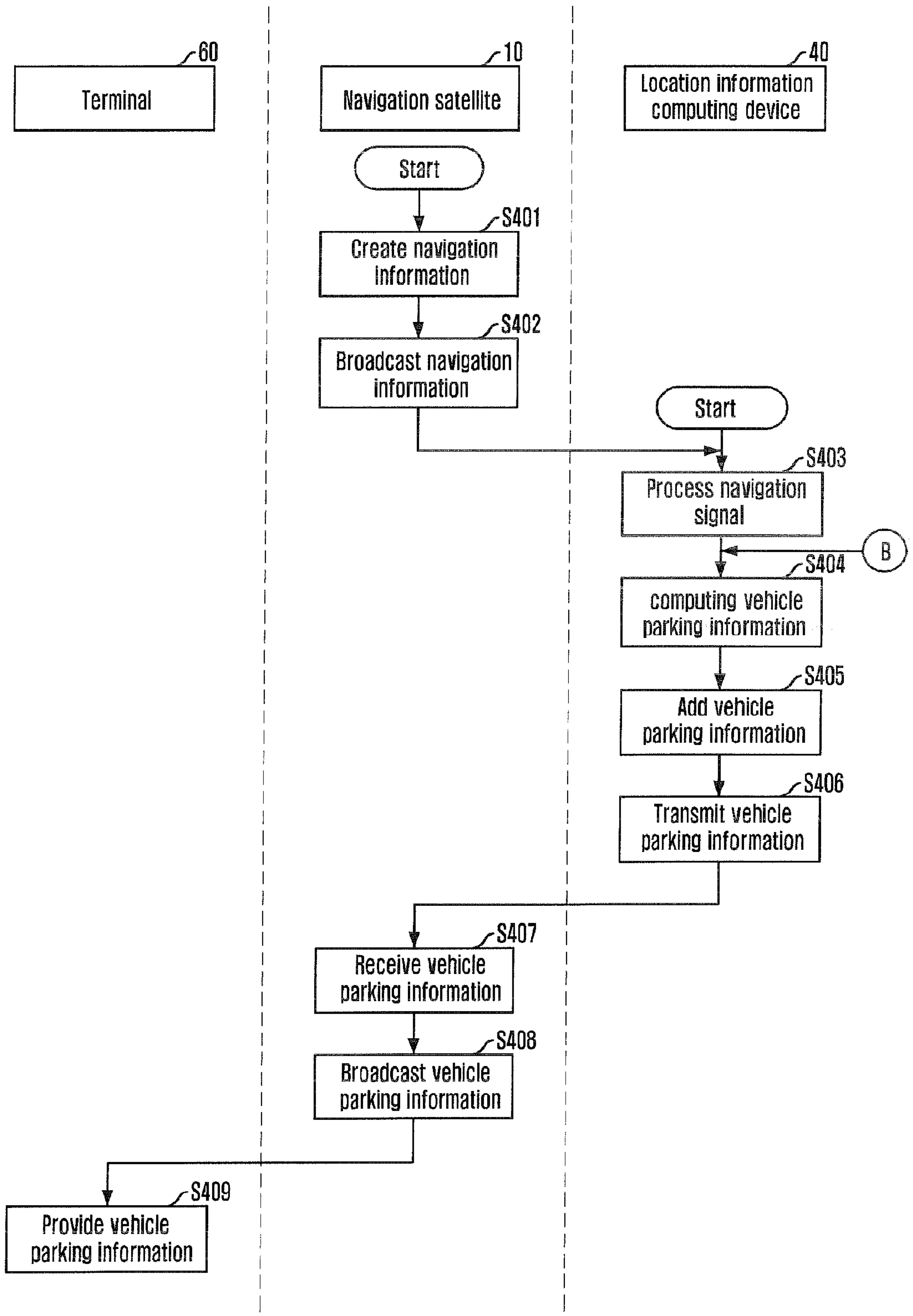
FIG. 4 is a flowchart describing a vehicle parking information providing method in accordance with an embodiment of the present invention.

FIG. 4 is a flowchart describing a vehicle parking information providing method in accordance with an embodiment of the present invention.

It is assumed that a location information output device 40 is located in each of the horizontal axis and vertical axes of the vehicle parking space region 100.

The navigation satellite 10 creates navigation information at step S401 and broadcasts the navigation information to the location information output device 40 in real-time at step S402.

The location information output device 40 acquires own present location information on GPS at step S403 by processing the navigation information, i.e., a navigation signal, broadcasted from the navigation satellite 10 in real-time.

When the parking space checking engine 30 transmits the vacant parking space acquisition information and the additional image of the photographed vacant parking space, the location information output device 40 outputs exact vehicle parking information in the vehicle parking space region 100 at step S404 based on the transmitted vacant parking space acquisition information and own present location information on GPS acquired at the step S403.

When the location information output device 40 is located in the horizontal axis of the vehicle parking space region 100, location information of the vacant parking space in the horizontal axis of the vehicle parking space region 100 is outputted. When the location information output device 40 is located in the vertical axis of the vehicle parking space region 100, location information of the vacant parking space in the vertical axis of the vehicle parking space region 100 is outputted.

At step S405, the location information output device 40 adds the additional image of the photographed vacant parking space transmitted from the parking space checking engine 30 at the step S404 and the vehicle parking information outputted at the step S404. The procedure of the step S405 is an additional procedure in the present invention.

The location information output device 40 transmits the outputted vehicle parking information and the additional image to the navigation satellite 10 at step S406.

The navigation satellite 10 receives the vehicle parking information transmitted from the location information output device 40 and the additional image at step S407 and broadcasts them to the terminal 60 mounted on the vehicle at step S408.

When the vehicle driver requests the vehicle parking information, the terminal 60 mounted on the vehicle provides the vehicle parking information broadcasted from the navigation satellite 10 and the additional image to the vehicle driver at step S409.

Although it is assumed in FIG. 4 that a location information output device 40 is located in each of the horizontal and vertical axes of the vehicle parking space region 100, the present invention is not limited to the assumption and can be applied to a plurality of location information output devices 40 which are located inside the vehicle parking space region 100.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

The present invention described above can reduce shortage of the vehicle parking space and raise efficiency in use of the present vehicle parking space by exactly providing the location information of the vacant parking space close to the present location to the vehicle driver based on the GPS technology.

Also, the present invention can reduce traffic jam and save a time and energy used for parking the vehicle by reducing a time that the vehicles search a parking space by exactly providing the location information of the vacant parking space.

The present invention reduces a time used for parking the vehicle such that the vehicle driver can efficiently park the vehicle.

The present invention does not require individual disposition of men for vehicle parking by providing the location information of the vacant parking space based on the GPS technology.

Since the present invention provides the image of the vacant parking space, the vehicle driver can easily select an optimal parking space.

The present invention can reduce waste of energy resources caused by unnecessary information and image by providing only the information on the vacant parking space.

The present invention may be applied to the vehicle parking information providing system.

While the present invention has been described with respect to the specific embodiments, it will be apparent to those skilled in the art that various changes and modifications may be made without departing from the spirit and scope of the invention as defined in the following claims.

What is claimed is:

1. A system for providing vehicle parking information, comprising:

monitoring means for photographing an image of a vehicle parking space and transmitting the image to a parking space checking means;

parking space checking means for checking a vacant parking space based on the transmitted vehicle parking space image and transmitting vacant parking space acquisition information to a location information computing means; and location information computing means for creating and transmitting location information of the vacant parking space, which is vehicle parking information, to a navigation satellite based on vehicle location information acquired based on navigation information transmitted from the navigation satellite and the transmitted vacant parking space acquisition information.

2. The system of claim 1, wherein the location information computing means includes:

a receiving unit for receiving the navigation information transmitted from the navigation satellite and the transmitted vacant parking space acquisition information;

a navigation signal processing unit for acquiring present vehicle location information on a Global Positioning System (GPS) by processing the received navigation information;

a location computing unit for computing the location information of the vacant parking space, which is vehicle parking information, based on the acquired present vehicle location information on GPS and the received vacant parking space acquisition information; and a transmitting unit for transmitting the computed vehicle parking information to the navigation satellite.

3. The system of claim 2, wherein the navigation satellite transmits the received vehicle parking information to a terminal.

4. The system of claim 3, wherein the terminal displays vehicle parking information acquired at a close distance from vehicle location among the received vehicle parking information.

5. The system of claim 1, wherein the location information computing means includes:

a receiving unit for receiving the transmitted navigation information, the transmitted vacant parking space acquisition information, and the vacant parking space image;

a navigation signal processing unit for acquiring present vehicle location information on GPS by processing the received navigation information;

a location computing unit for computing the vehicle parking information based on present vehicle location information on GPS and the received vacant parking space acquisition information;

an information adding unit for adding the received vacant parking space image and the outputted vehicle parking information to thereby produce added parking data; and a transmitting unit for transmitting the added parking data acquired by adding vehicle parking information and vacant parking space image to the navigation satellite.

6. The system of claim 5, wherein the navigation satellite transmits the received vehicle parking information and the vacant parking space image to the terminal.

7. The system of claim 6, wherein the terminal displays the received vehicle parking information and the vacant parking space image.

8. The system of claim 2, wherein the location computing unit computes vacant parking space location information in a horizontal axis of the vehicle parking space when the location information computing means is located in the horizontal axis of the vehicle parking space, and computes vacant parking space location information in a vertical axis of the vehicle parking space when the location information computing means is located in the vertical axis of the vehicle parking space.

9. The system of claim 1, wherein the vacant parking space acquisition information includes identification (ID) to be recognized by the location information computing means.

10. The system of claim 1, wherein the vacant parking space acquisition information includes location information on the vacant parking space inside a vehicle parking space region to be recognized by the location information computing means.

11. The system of claim 1, wherein the parking space checking means determines an operation of a vehicle in each block of a vehicle parking space region and checks whether there is a vacant parking space in the vehicle parking space region.

12. The system of claim 1, wherein the parking space checking means determines whether there is a vehicle body in each block of a vehicle parking space region and checks whether there is a vacant parking space in the vehicle parking space region.

13. The system of claim 1, wherein the location information computing means is located in each of horizontal and vertical axes of the vehicle parking space region at predetermined intervals.

14. A method for providing vehicle parking information, comprising:

photographing a vehicle parking space to acquire an image of the vehicle parking space;

creating vacant parking space acquisition information by finding a vacant parking space based on the acquired parking space image; and creating location information of the vacant parking space, which is vehicle parking information, based on vehicle location information acquired based on navigation information transmitted from an external navigation satellite and the created vacant parking space acquisition information, and transmitting the vehicle parking information to the navigation satellite.

15. The method of claim 14, wherein said creating the vehicle parking information includes:

acquiring present vehicle location information on Global Positioning System (GPS) by processing the received navigation information;

computing the vehicle parking information based on the acquired present vehicle location information on GPS and the created vacant parking space acquisition information; and transmitting the computed vehicle parking information to the navigation satellite and transmitting the vehicle parking information to a terminal.

16. The method of claim 14, wherein said creating the vehicle parking information includes:

acquiring present vehicle location information on GPS by processing the received navigation information;

computing the vehicle parking information based on acquired present vehicle location information on GPS and the created vacant parking space acquisition information;

adding the vacant parking space image and the outputted vehicle parking information to thereby produce add data; and transmitting the added data acquired by adding the vehicle parking information and the vacant parking space image to the navigation satellite and transmitting the added data from the navigation satellite to a terminal.

17. The method of claim 14, wherein the vacant parking space acquisition information includes identification (ID).

18. The method of claim 14, wherein the vacant parking space acquisition information includes location information on the vacant parking space in a vehicle parking space region.

19. The method of claim 14, wherein the vacant parking space acquisition information is created by determining an operation of a vehicle in each block of the vehicle parking space and checking whether there is a vacant parking space in the vehicle parking space region.

20. The method of claim 14, wherein the vacant parking space acquisition information is created by determining whether there is a vehicle body in each block of a vehicle parking space region and checking whether the vacant parking space is acquired in the vehicle parking space region.

* * * * *